Jan. 5, 1971   H. MARQUARDT   3,552,829
PHOTOGRAPHIC GAUSS TYPE OBJECTIVE
Filed Dec. 2, 1968
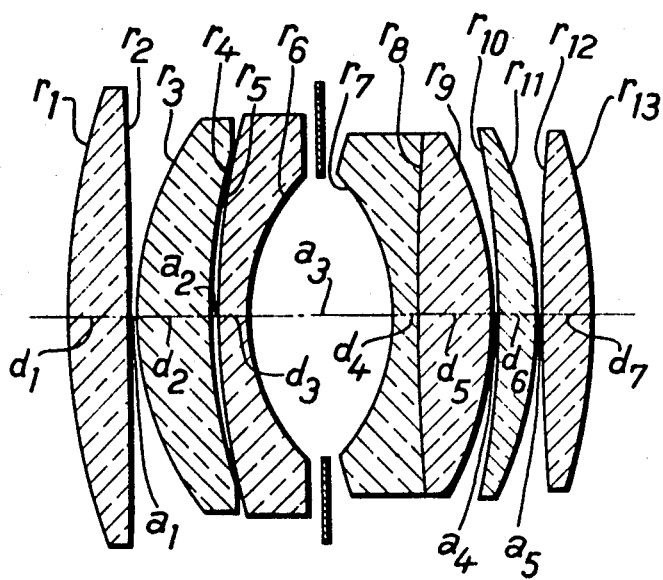
INVENTOR
Heinz Marquardt
By Krafft & Wells
ATTORNEYS

United States Patent Office 3,552,829
Patented Jan. 5, 1971

3,552,829
PHOTOGRAPHIC GAUSS TYPE OBJECTIVE
Heinz Marquardt, Wetzlar, Germany, assignor to Ernst
  Leitz G.m.b.H., Wetzlar, Germany
Filed Dec. 2, 1968, Ser. No. 780,520
Claims priority, application Germany, Dec. 9, 1967,
  1,268,873
Int. Cl. G02b 9/62, 11/32
U.S. Cl. 350—176                              1 Claim

ABSTRACT OF THE DISCLOSURE

A photographic Gauss type obective is disclosed which comprises in the direction of light travel three singlet lens members in front of the objective diaphragm and a cemented double lens member followed by two singlet lens members behind the diaphragm. The relative aperture is at least as great as $f:1.4$, while the back focal distance is greater than 70% of the objective's focal length, and the field angle is about $\pm 20°$.

BACKGROUND OF THE INVENTION

It is an object of the present invention to provide a photographic objective of a great relative aperture which is particularly suitable for use in single lens reflex cameras. Objectives that are to be used in the mentioned type of cameras must have a relatively great back focal distance in order to permit the reflex mirror to swing from a viewing position to a picture taking position, and vice versa.

It is therefore a particular object of the invention to provide an objective having a relative aperture of at least $f:1.4$ and at the same time having a back focal distance which is greater than 70% of the focal length of the objective.

SUMMARY OF THE INVENTION

The above cited objects are attained by an objective which is constructed by the use of the constructional data given in the table below wherein the thicknesses, spacings and radii are provided in multiples of the focal length of the objective, and wherein:

$r_1$ to $r_{13}$ represent the radii of successive lens surfaces,
$d_1$ to $d_7$ represent the axial thicknesses of the respective lenses,
$a_1$ to $a_5$ represent the axial spacings between the respective lenses,
$n_e$ and $v_e$ represent respectively the refractive indices and Abbe numbers of the lens materials, and
$\Delta n/r$ represents the refractive power of the respective lens surface, which data could also be written as $$\frac{n'-n}{r}$$

wherein $n'$ is the refractive index of the material behind the surface, $n$ is the refractive index of the material in front of the surface, and $r$ is the radius of the surface.

The table is to be read in connection with the drawing which represents a view of an objective incorporating the invention and cut along the optical axis.

| Radii | Thicknesses and spacings | $n_e$ | $v_e$ | $\Delta n/r$ |
|---|---|---|---|---|
| $r_1 = +1.1331$ | | | | +0.719265 |
| | $d_1 = 0.1048$ | 1.81500 | 45.2 | |
| $r_2 = +12.0000$ | | | | −0.067916 |
| | $a_1 = 0.0113$ | | | |
| $r_3 = +0.5136$ | | | | +1.351246 |
| | $d_2 = 0.1312$ | 1.69400 | 54.6 | |
| $r_4 = +1.0375$ | | | | −0.668915 |
| | $a_2 = 0.0160$ | | | |
| $r_5 = +1.6920$ | | | | +0.372358 |
| | $d_3 = 0.0451$ | 1.63003 | 35.4 | |
| $r_6 = +0.3459$ | | | | −1.821422 |
| | $a_3 = 0.2286$ | | | |
| $r_7 = -0.3895$ | | | | −2.032862 |
| | $d_4 = 0.0571$ | 1.79180 | 25.9 | |
| $r_8 = +4.9204$ | | | | +0.001747 |
| | $d_5 = 0.1237$ | 1.80040 | 42.7 | |
| $r_9 = -0.7193$ | | | | +1.112748 |
| | $a_4 = 0.0019$ | | | |
| $r_{10} = -2.5179$ | | | | −0.317883 |
| | $d_6 = 0.0810$ | 1.80040 | 42.7 | |
| $r_{11} = -0.7525$ | | | | +1.063654 |
| | $a_5 = 0.0019$ | | | |
| $r_{12} = +3.9626$ | | | | +0.180727 |
| | $d_7 = 0.0810$ | 1.71615 | 53.7 | |
| $r_{13} = -1.2605$ | | | | +0.568147 |
| | $\Sigma d = 0.8836$ | | | |

Variations from the above thicknesses and spacings data can be tolerated if they do not exceed $\pm 10\%$. From the surface refractive powers $$\left(\frac{\Delta n}{r}\right)$$

variations can be permitted in a range of $\pm 15\%$. The latter variations may be attained by a change of the radii and/or by variations in the refractive indices of the used glass types.

What is claimed is:
1. A photographic Gauss type objective having a relative aperture of at least $f:1.4$ and a back focal distance of at least 70% of the focal length of the objective, and a field angle of approximately $\pm 20°$, said objective comprising in the direction of light travel three singlet lens members in front of the objective diaphragm, and one cemented double lens member followed by two singlet lens member behind said diaphragm, said lens members having substantially the following approximate specifications:

| Radii | Thicknesses and spacings | $n_e$ | $v_e$ | $\Delta n/r$ |
|---|---|---|---|---|
| $r_1 = +1.1331$ | | | | +0.719265 |
| | $d_1 = 0.1048$ | 1.81500 | 45.2 | |
| $r_2 = +12.0000$ | | | | −0.067916 |
| | $a_1 = 0.0113$ | | | |
| $r_3 = +0.5136$ | | | | +1.351246 |
| | $d_2 = 0.1312$ | 1.69400 | 54.6 | |
| $r_4 = +1.0375$ | | | | −0.668915 |
| | $a_2 = 0.0160$ | | | |
| $r_5 = +1.6920$ | | | | +0.372358 |
| | $d_3 = 0.0451$ | 1.63003 | 35.4 | |
| $r_6 = +0.3459$ | | | | −1.821422 |
| | $a_3 = 0.2286$ | | | |
| $r_7 = -0.3895$ | | | | −2.032862 |
| | $d_4 = 0.0571$ | 1.79180 | 25.9 | |
| $r_8 = +4.9204$ | | | | +0.001747 |
| | $d_5 = 0.1237$ | 1.80040 | 42.7 | |
| $r_9 = -0.7193$ | | | | +1.112748 |
| | $a_4 = 0.0019$ | | | |
| $r_{10} = -2.5179$ | | | | −0.317883 |
| | $d_6 = 0.0810$ | 1.80040 | 42.7 | |
| $r_{11} = -0.7525$ | | | | +1.063654 |
| | $a_5 = 0.0019$ | | | |
| $r_{12} = +3.9626$ | | | | +0.180727 |
| | $d_7 = 0.0810$ | 1.71615 | 53.7 | |
| $r_{13} = -1.2605$ | | | | +0.568147 |
| | $\Sigma d = 0.8836$ | | | | wherein the data given for the thicknesses, spacings and radii are expressed in multiples of the focal length of the objective.

References Cited

UNITED STATES PATENTS 3,451,745 6/1969 Kazamaki et al. ---- 350—215X

JOHN K. CORBIN, Primary Examiner

U.S. Cl. X.R.

350—215